United States Patent
Lee et al.

(10) Patent No.: US 10,675,606 B2
(45) Date of Patent: Jun. 9, 2020

(54) MID-TEMPERATURE RANGE DRY REGENERABLE SOLID CARBON DIOXIDE SORBENT, SLURRY COMPOSITION AND METHOD FOR MANUFACTURING THE SAME

(71) Applicants: KOREA ELECTRIC POWER CORPORATION, Jeollanam-do (KR); KOREA WESTERN POWER CO., LTD., Seoul (KR)

(72) Inventors: Joong Beom Lee, Daejeon (KR); Dong Hyeok Choi, Daejeon (KR); Tae Hyoung Eom, Daejeon (KR); Jeom In Baek, Daejeon (KR); Seong JeGarl, Daejeon (KR)

(73) Assignees: KOREA ELECTRIC POWER CORPORATION, Jeollanam-do (KR); KOREA WESTERN POWER CO., LTD., Seoul (KR)

( * ) Notice: Subject to any disclaimer, the term of this patent is extended or adjusted under 35 U.S.C. 154(b) by 0 days.

(21) Appl. No.: 16/411,438

(22) Filed: May 14, 2019

(65) Prior Publication Data
US 2019/0262796 A1  Aug. 29, 2019

Related U.S. Application Data

(62) Division of application No. 15/503,574, filed as application No. PCT/KR2015/006698 on Jun. 30, 2015, now Pat. No. 10,335,762.

(30) Foreign Application Priority Data

Sep. 29, 2014 (KR) .......................... 10-2014-0130291

(51) Int. Cl.
| | | |
|---|---|---|
| B01J 20/12 | (2006.01) | |
| B01J 20/06 | (2006.01) | |
| B01J 20/30 | (2006.01) | |
| B01J 20/04 | (2006.01) | |
| B01J 20/08 | (2006.01) | |
| B01J 20/28 | (2006.01) | |
| B01J 20/32 | (2006.01) | |
| C10K 1/32 | (2006.01) | |
| B01J 20/10 | (2006.01) | |
| C01B 3/12 | (2006.01) | |

(52) U.S. Cl.
CPC ............. *B01J 20/12* (2013.01); *B01J 20/04* (2013.01); *B01J 20/041* (2013.01); *B01J 20/043* (2013.01); *B01J 20/06* (2013.01); *B01J 20/08* (2013.01); *B01J 20/10* (2013.01); *B01J 20/2803* (2013.01); *B01J 20/30* (2013.01); *B01J 20/305* (2013.01); *B01J 20/3042* (2013.01); *B01J 20/3078* (2013.01); *B01J 20/3204* (2013.01); *B01J 20/3236* (2013.01); *C01B 3/12* (2013.01); *C10K 1/32* (2013.01); *B01D 2257/504* (2013.01); *C01B 2203/0283* (2013.01); *C01B 2203/0425* (2013.01); *C01B 2203/0475* (2013.01)

(58) Field of Classification Search
CPC ...................................................... B01J 20/04
See application file for complete search history.

(56) References Cited

U.S. PATENT DOCUMENTS 8,207,086 B2   6/2012   Yu et al.

FOREIGN PATENT DOCUMENTS

| KR | 10-2006-0011738 | 2/2006 |
|---|---|---|
| KR | 10-2006-0079588 | 7/2006 |
| KR | 10-2006-0079589 | 7/2006 |
| KR | 10-2012-0033128 | 4/2012 |
| KR | 10-2012-0033129 | 4/2012 |
| KR | 10-2013-0034993 | 4/2013 |

OTHER PUBLICATIONS

English machine translation of Lee et al., KR20120033129A (Year: 2012).*
International Search Report dated Jul. 29, 2015 for PCT/KR2015/006698.

* cited by examiner

*Primary Examiner* — Peter F Godenschwager

(57) ABSTRACT

Provided are a composition and a manufacturing method of a solid $CO_2$ sorbent having excellent physical properties and chemical reaction characteristics, particularly having an excellent mid-temperature range activity for a fluidized bed process, for use in collecting a $CO_2$ source (pre-combustion or pre-utilization) in syngas application fields such as integrated coal gasification combined cycle (IGCC) power systems, synthetic natural gas (SNG) and synthetic liquid fuel (CTL).

16 Claims, 5 Drawing Sheets

MID-TEMPERATURE RANGE DRY REGENERABLE SOLID CARBON DIOXIDE SORBENT, SLURRY COMPOSITION AND METHOD FOR MANUFACTURING THE SAME

This application is a divisional of Joong Beom Lee et al., U.S. patent application Ser. No. 15/503,574, filed on Feb. 13, 2017, entitled "MID-TEMPERATURE RANGE DRY REGENERABLE SOLID CARBON DIOXIDE SORBENT, SLURRY COMPOSITION AND METHOD FOR MANUFACTURING THE SAME", which claims the priority of Korean Patent Application No. 10-2014-0130291, filed on Sep. 29, 2014 in the KIPO (Korean Intellectual Property Office), the disclosure of which is incorporated herein entirely by reference. Further, this application is the National Stage application of International Application No. PCT/KR2015/006698, filed Jun. 30, 2015, which designates the United States and was published in Korean. Each of these applications is hereby incorporated by reference in their entirety into the present application.

TECHNICAL FIELD

The present invention relates to a mid-temperature range dry regenerable carbon dioxide ($CO_2$) sorbent for a water gas shift process for promoting a fluidized membrane. More particularly, the present invention relates to a mid-temperature range dry regenerable carbon dioxide ($CO_2$) sorbent comprising an active ingredient, a support, a reaction accelerator, an inorganic binder, and a viscosity modifier, a slurry composition comprising the same, and a method for manufacturing the same.

BACKGROUND ART

Pre-combustion $CO_2$ capture & storage technology is applied to $CO_2$ source (pre-combustion or pre-utilization) capture & storage of synthetic gas (syngas) application fields such as integrated gasification combined cycle (IGCC) power systems, synthetic natural gas (SNG), or coal to liquid (CTL) fuel, and selectively captures and stores only $CO_2$ after shifting carbon monoxide in coal syngas into hydrogen and carbon dioxide through a water-gas shift reaction (CO+ $H_2O \rightarrow CO_2+H_2$). Conventional commercial pre-combustion $CO_2$ capture & storage processes include Selexol, Rectisol and so on, employing physical sorbents. However, these conventional processes have several problems of low heat efficiency due to low-temperature operation, consumption of a large amount of recycled energy, necessity for additional energy for $CO_2$ compression, complexity in process design, and so on. In addition, the polymer membrane technology that is nowadays actively researched enables high-temperature high-pressure operations, thereby achieving high-energy efficiency, but has a problem of difficulty in application to large-scale industries due to a low yield. In order to overcome disadvantages of the existing pre-combustion $CO_2$ capture & storage technology, the fluidized bed sorption enhanced water gas shift (SEWGS) process employing dry $CO_2$ sorbents and catalysts is being recently developed.

Among patents related to the conventional pre-combustion $CO_2$ capture & storage technology, U.S. Pat. No. 8,207,086 reported that layered nano carbonate was developed as a medium-high temperature $CO_2$ sorbent, which demonstrates high activity in capturing $CO_2$ at a temperature above 600° C.

DISCLOSURE OF THE INVENTION

Technical Problem

Embodiments of the present invention provide a mid-temperature range dry regenerable solid carbon dioxide ($CO_2$) sorbent for a fluidized bed sorption enhanced water gas shift (SEWGS) process.

The mid-temperature range dry regenerable solid carbon dioxide ($CO_2$) sorbent for a fluidized bed sorption enhanced water gas shift (SEWGS) process is proposed for capturing and storing $CO_2$ source (pre-combustion or pre-utilization) in syngas application fields such as an integrated gasification combined cycle (IGCC) power systems, synthetic natural gas (SNG) or coal to liquid (CTL) fuel, while minimizing consumption of the energy, thereby holding excellent sorption capacity, compared to existing commercial wet $CO_2$ sorbent (Selexsol, Rectisol, etc.) and implementing a physical strength suitable for a fluidized bed process, a sorbent composition using the $CO_2$ sorbent, and a method for manufacturing the same.

Technical Solution

The above and other aspects of the present invention will be described in or be apparent from the following description of exemplary embodiments.

According to an aspect of the present invention, there is provided a mid-temperature range dry regenerable solid carbon dioxide ($CO_2$) sorbent composition applicable for a fluidized bed sorption enhanced water gas shift (SEWGS) process, the mid-temperature range dry regenerable solid carbon dioxide ($CO_2$) sorbent composition including 10 to 70 parts by weight of an active ingredient, 10 to 60 parts by weight of a support, 3 to 30 parts by weight of a reaction accelerator, 5 to 20 parts by weight of an inorganic binder, and 0.1 to 3 parts by weight of a viscosity modifier, based on the total weight of the mid-temperature range dry regenerable solid carbon dioxide ($CO_2$) sorbent composition.

According to another aspect of the present invention, there is provided a slurry composition.

The slurry composition includes the mid-temperature range dry regenerable carbon dioxide ($CO_2$) sorbent composition of one of claims 1 to 8, and a solvent, the slurry composition including 0.05 to 10 parts by weight of a dispersant, 0.005 to 0.5 parts by weight of a defoamer, and 0.1 to 5 parts by weight of an organic binder, based on the total weight of the slurry composition.

According to still another aspect of the present invention is discussed below.

There is provided a method for manufacturing a mid-temperature range dry regenerable solid carbon dioxide ($CO_2$) sorbent.

The method including preparing a slurry by mixing solid raw materials with water and comminuting the resulting mixture, primarily forming a sorbent in the form of spherical particles by spray-drying the prepared slurry, and preparing a final sorbent by dry-calcining the sorbent, wherein a concentration of the solid raw materials contained in the slurry is in a range of 10 to 50 parts by weight, based on the total weight of the slurry.

Advantageous Effects

According to the present invention, the working time and efficiency of the sorbent manufacturing process can be secured by employing the viscosity modifier and the stability in using the absorption-regeneration repeat cycles can be increased by a combination of various groups of active ingredients including magnesium oxide. In addition, in order to supplement physical properties, nano-sized water-dispersible aluminum hydroxide is used, thereby noticeably increasing the tap density and attrition resistance.

The dry $CO_2$ sorbent composition according to the present invention has excellent sorption capacity, compared to the existing commercial wet $CO_2$ sorbent composition.

The dry $CO_2$ sorbent composition according to the present invention can implement physical strength suitable for a fluidized bed process.

In addition, the tap density and the attrition resistance as physical (mechanical) strength can be markedly improved by increasing the filling density of unit sorbent particles using a nano-sized water-dispersible alumina compound.

In addition, the dry $CO_2$ sorbent composition according to the present invention demonstrates excellent characteristics in chemical reaction aspects, such as high $CO_2$ sorption capacity, stability, etc. and excellent physical or mechanical properties, such as tap density, attrition resistance, etc. and can be directly applied to pre-combustion $CO_2$ capture & storage plant using a fluidized bed process for commercial purposes without further research, while noticeably increasing ease of manufacture by employing various viscosity modifiers (e.g., glucose, methyl cellulose, melamine-based solid additive, etc.).

The high level of technology perfection of the mid-temperature range dry regenerable solid $CO_2$ sorbent according to the present invention and the manufacturing method thereof has allowed market entry and use in collecting a $CO_2$ source (pre-combustion or pre-utilization) in syngas application fields such as integrated coal gasification combined cycle (IGCC) power systems, synthetic natural gas (SNG) and synthetic liquid fuel (CTL). Therefore, when considering the goal of greenhouse gas reduction for lowering the global atmospheric temperature to below 2005 level by 2050, since the market volume is expected to increase tremendously, a huge far-reaching effect of the technology will be created.

MODE FOR CARRYING OUT THE INVENTION

Figure 1:
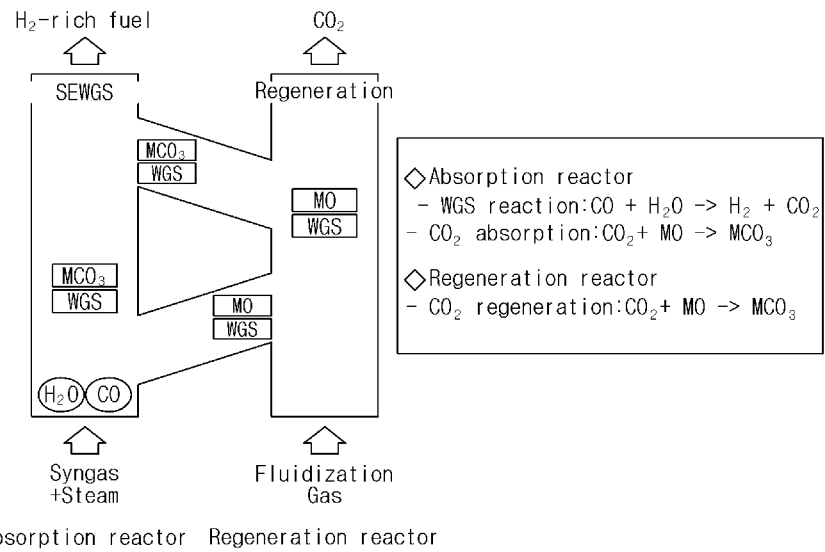
FIG. 1 is a diagram illustrating a fluidized bed sorption enhanced water gas shift (SEWGS) process employing a mid-temperature range dry regenerable solid carbon dioxide sorbent according to the present invention.

Hereinafter, exemplary embodiments will be described in detail with reference to accompanying drawings.

Hereinafter, the present invention will be described in detail. The present invention relates to a mid-temperature range dry regenerable solid carbon dioxide ($CO_2$) sorbent composition, which can be applied to a fluidized bed sorption enhanced water gas shift (SEWGS) process, the $CO_2$ sorbent composition comprising 10 to 70 parts by weight of an active ingredient, 10 to 60 parts by weight of a support, 3 to 30 parts by weight of a reaction accelerator, 5 to 20 parts by weight of an inorganic binder, and 0.1 to 3 parts by weight of a viscosity modifier, based on the total weight of the solid $CO_2$ sorbent composition.

(1) Composition of Mid-Temperature Range (200~400° C.) Regenerable Solid $CO_2$ Sorbent The mid-temperature range regenerable solid $CO_2$ sorbent according to the present invention includes an active ingredient, a support, a reaction accelerator, an inorganic binder, a viscosity modifier and other additives. The active ingredient is most important in actually absorbing carbon dioxide ($CO_2$) converted from carbon monoxide (CO) in the syngas. Examples of the active ingredient include an alkali metal, an alkaline earth metal, a transition metal, a metal carbonate, a metal bicarbonate, a metal oxide and a metal hydrate. Preferably, usable examples of the active ingredient include magnesium oxide (MgO), magnesium carbonate ($MgCO_3$), magnesium nitrate hydrate ($Mg(NO_3)_2.6H_2O$), calcium magnesium carbonate ($CaMg(CO_3)_2$), potassium carbonate ($K_2CO_3$), sodium carbonate ($Na_2CO_3$), lithium carbonate ($LiCO_3$), and manganese oxide (MnO).

In the present invention, the active ingredient may be used in an amount of 10 to 70 parts by weight, preferably 15 to 60 parts by weight, based on the total weight of solid raw materials. The purity of the active ingredient is preferably 98% or greater.

In the present invention, the support imparts physical strength to the sorbent to be applied to a fluidized bed process while serving as a carrier for highly dispersing active materials and maximizing an active surface area. Therefore, the support needs to have a large specific surface area to easily support the active material and a porous structure. In addition, when considering a potentiality of applying the support to be applied to a fluidized bed process, the intrinsic mechanical strength of the support should be high. Examples of the support include aluminum oxide ($\alpha$-$Al_2O_3$, $\gamma$-$Al_2O_3$), nano-sized water-dispersible aluminum hydroxide, $\alpha$-alumina monohydrate, $\gamma$-alumina monohydrate, hydrotalcite, Yttria-stabilized zirconia (Yi-$ZrO_2$), silicon oxide ($SiO_2$), cerium oxide ($CeO_2$), and zirconium oxide ($ZrO_2$). Preferably, usable examples of the support include aluminum oxide ($\alpha$-$Al_2O_3$, $\gamma$-$Al_2O_3$), nano-sized water-dispersible aluminum hydroxide, $\alpha$-alumina monohydrate, $\gamma$-alumina monohydrate, hydrotalcite, Yttria-stabilized zirconia (Yi-$ZrO_2$). The support may be used for the total raw materials in an amount of 10 to 60 parts by weight, preferably 20 to 55 parts by weight. Here, the support used preferably has a purity of 98% or greater and a specific surface area of 80 $m^2$/g or greater.

In the present invention, the reaction accelerator is a kind of a cocatalyst for increasing the reactivity and durability of the sorbent and examples thereof include cerium oxide ($CeO_2$), zirconium oxide ($ZrO_2$), titanium oxide ($TiO_2$), yttrium oxide ($Yi_2O_3$), cerium oxide lanthanum (La/$CeO_2$), lanthanum oxide ($La_2O_3$), and magnesium silicate ($Mg_3Si_4O_{10}(OH)_2$). Preferably, the reaction accelerator is at least one selected from the group consisting of zirconium oxide ($ZrO_2$), titanium oxide ($TiO_2$), yttrium oxide ($Yi_2O_3$), cerium oxide lanthanum (La/$CeO_2$), and magnesium silicate ($Mg_3Si_4O_{10}(OH)_2$).

The reaction accelerator may be used in an amount of 3 to 30 parts by weight, preferably 5 to 20 parts by weight, based on the total weight of solid raw materials.

In the present invention, the inorganic binder serves to bind the active ingredient with the support to impart mechanical strength to the sorbent and allows the sorbent to be usable without attrition loss due to long-term fluidization. The inorganic binder is at least one selected from clay, such as bentonite or kaolin, and pseudo-boehmite. Preferably, bentonite or pseudo-boehmite is preferably used as the inorganic binder. The inorganic binder may be used in an amount of 5 to 20 parts by weight, preferably 5 to 10 parts by weight, based on the total weight of solid raw materials.

In the present invention, the viscosity modifier delays an increase in the viscosity according to the progress of a hydration reaction in which magnesium oxide (MgO) included in the active ingredient or the support reacts with water in the slurry preparing process, and usable examples thereof include glucose, methyl cellulose, melamine-based compound (e.g., Melment F10). The viscosity modifier may be used in an amount of 0.1 to 3 parts by weight, based on the total weight of solid raw materials.

(2) Slurry Composition of Mid-Temperature Range (200~400° C.) Regenerable Solid $CO_2$ Sorbent For ease of a manufacturing process for long-term mass production process of $CO_2$ sorbent according to the present invention, the solid raw materials are mixed with water as a solvent to prepare a slurry. In order to maintain an appropriate viscosity, stability and dispersibility of the slurry, additives including a viscosity modifier, a dispersant, a defoamer, an organic binder, etc. are required.

In the present invention, the dispersant is an anionic dispersant, including polycarboxylic acid, polycarboxylic acid amine, polycarboxylic acid amine salt, and polycarboxylic acid soda salt, and may be used in an amount of 0.05 to 10 parts by weight, based on the total weight of solid raw materials.

In the present invention, the defoamer may be used to remove bubbles formed in the slurry to secure homogeneity of the slurry and usable examples thereof may include metal soap-based and polyester-based nonionic surfactants. The defoamer may be used in an amount of 0.005 to 0.5 parts by weight, based on the total weight of solid raw materials.

In the present invention, the organic binder imparts plasticity and flowability to the slurry to then provide strength to the solid sorbent particles formed in the spray drying process, thereby facilitating handling of the particles prior to drying and calcining. In the present invention, usable examples of the organic binder may include one or more selected from the group consisting of a polyvinylalcohol-based material, a polyglycol-based material and methylcellulose. Usable examples of the organic binder may include a polyvinyl alcohol-based material, a polyethylene glycol-based material and a combination thereof. The organic binder may be used in an amount of 0.1 to 5 parts by weight, based on the total weight of solid raw materials.

(3) Manufacture of Mid-Temperature Range (200~400° C.) Regenerable Solid $CO_2$ Sorbent The method for manufacturing a solid carbon dioxide ($CO_2$) sorbent includes the steps of: preparing a slurry by mixing and pulverizing solid raw materials; primarily forming the slurry into a spherical sorbent by spray-drying the prepared slurry; manufacturing a final sorbent by dry-calcining the solid raw materials.

In detail, the method for manufacturing a solid carbon dioxide ($CO_2$) sorbent largely consists of 4 steps, which are shown in FIGS. 2 to 5.

Figure 2:
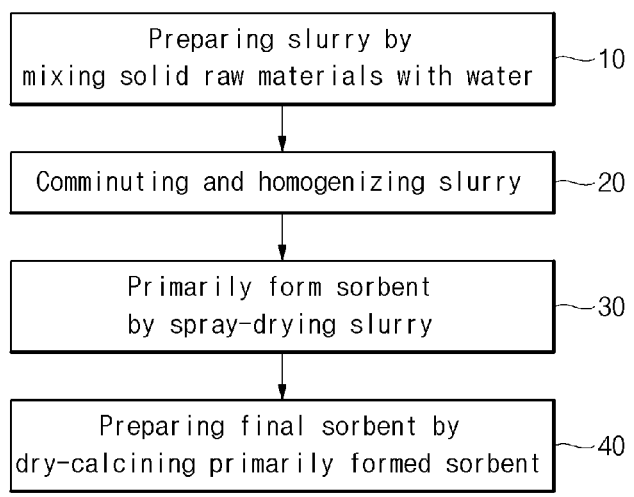
FIG. 2 is a processing flow diagram illustrating a method of manufacturing a mid-temperature range dry regenerable solid carbon dioxide sorbent according to the present invention.

FIG. 2 is a diagram illustrating processing steps of a method of manufacturing a mid-temperature range dry regenerable solid carbon dioxide sorbent according to the present invention.

The method of manufacturing a mid-temperature range dry regenerable solid carbon dioxide sorbent according to the present invention includes the steps of (10) preparing a slurry by mixing solid raw materials with water, (20) comminuting and homogenizing the prepared slurry, (30) primarily forming a sorbent by spray-drying the prepared slurry, (40) manufacturing a final sorbent by dry-calcining the solid raw materials.

Figure 3:
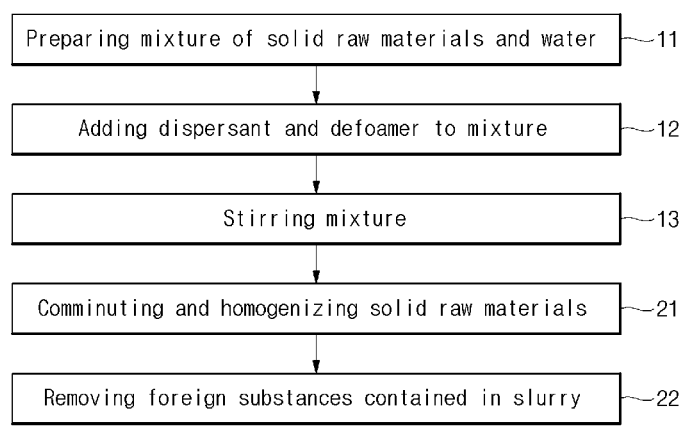
FIG. 3 is a processing flow diagram specifically illustrating the step of preparing slurry.

FIG. 3 is a processing flow diagram specifically illustrating the step of preparing slurry. Various raw materials are accurately weighed according to the composition and distilled water corresponding to the concentration of the slurry to be prepared (in a weight ratio of solid raw materials to a liquid solvent, e.g., water) is poured into an appropriate container to prepare a mixture of the solid raw materials and water (step 11). Here, a viscosity modifier, a dispersant and a defoamer may be added to impart flowability to the slurry and to control smooth mixing and dispersion of the raw materials and the flowability. A soluble material is first completely dissolved, and additives, including a support, a reaction accelerator and an inorganic binder or a viscosity modifier, are added thereto and then mixed (step 12). In this stage, a dispersant or a defoamer may be additionally added, and in order to prevent excess dispersant from being used, the concentration of the slurry may be adjusted using water or the viscosity modifier. The concentration of the final slurry is preferably in a range of 10 to 50 parts by weight, and more preferably in a range of 15 to 30 parts by weight. During and/or after adding all of raw materials, the resulting mixture is stirred using a stirrer to homogenize the solid raw materials (step 13). Here, the stirrer used is not particularly limited but a mechanical stirrer, a homogenizer, an ultrasonic homogenizer, a high shear blender, a double-helix mixer, or a high speed emulsifier may be selectively used according to the amount of raw materials added. When necessary, to comminute particles of solid raw materials contained in the mixed slurry to 1 μm or less and to homogeneously dispersed the comminuted particles, an additional dispersant, a defoamer and a pH controlling agent may be additionally added to prepare a more stabilized slurry. If the added raw materials are mixed, the solid raw materials are comminuted and homogenized (step 21). In comminuting, in order to improve a comminuting effect and to solve a problem of scattering of particles, wet comminuting using a high energy bead mill may be used. Here, Yttria stabilized zirconia beads having a size distribution in a range of 0.3 mm to 1.25 mm may be used as milling media and a filling quantity of the milling media in comminuting and homogenizing is preferably 50 to 70% of the volume of a milling container. To control the particle sizes of the solid raw materials contained in the slurry to 1 µm or less and to produce a homogenous slurry, the comminuting or homogenizing may be performed twice or more. Prior to final comminuting, an organic binder may be added to the slurry to homogenize the slurry. Removing of foreign substances contained in the comminuted or homogenized slurry (dust, dried slurry lump or impurity, etc.) may be performed while sieving the slurry (step 22).

Figure 4:
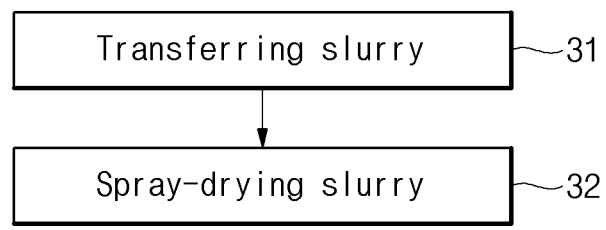
FIG. 4 is a processing flow diagram specifically illustrating the step of forming a sorbent by spray-drying the prepared slurry of FIG. 3.

After the comminuting or homogenizing is completed, transferring and spray-drying of the slurry are performed, as shown in FIG. 4. The slurry transferred to a pump of a spray dryer via a separate container (step 31) is sprayed into the spray dryer to form spherical sorbent particles having a particle size of 30 to 400 µm (step 32). The spray dryer may be fabricated to spray-dry the slurry in a counter-flow drying manner using a pressure nozzle. Here, desirable operational conditions of the spray drier for forming the spherical sorbent particles may include 5 to 15 kg/cm$^2$ in a feed pressure, 0.4 to 1.6 mm in an inner diameter of the pressure nozzle, 260 to 300° C. in a temperature of an inlet of the spray dryer, and 90 to 150° C. in a temperature of an outlet of the spray dryer.

Figure 5:
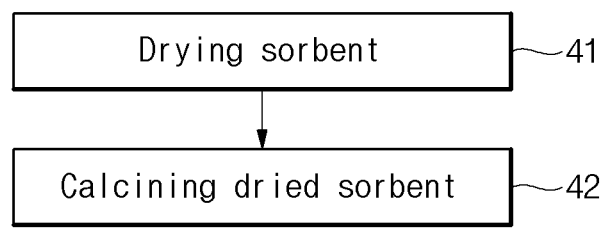
FIG. 5 is a processing flow diagram specifically illustrating the step of preparing a final sorbent by dry-calcining the formed sorbent of FIG. 4.

FIG. 5 illustrates the step of preparing a final sorbent by dry-calcining the sorbent formed by spray-drying. The sorbent is dried in a reflux dryer at 110 to 150° C. for more than 2 hours (step 41). Here, the drying is performed in an air atmosphere. Thereafter, the dried sorbent is put into a calcination furnace, such as a muffle furnace, a tubular furnace or a kiln, and the calcination temperature is raised at a rate of 0.5 to 10° C./min in an atmosphere of air, nitrogen, helium, hydrogen, vapor or a reducing gas to reach a final calcination temperature ranging from 350 to 1,000° C. Then, the final calcination temperature is maintained for more than 2 hours. The solid sorbent particles may be stayed at two or more stages of stagnation temperatures each for more than 30 minutes before reaching the final calcining temperature, and may then be finally calcined (step 42). As a result, most of the particles of the mid-temperature range (200~400° C.) dry regenerable solid $CO_2$ sorbent manufactured through the 4-step process satisfied fluidized bed process requirements. That is to say, the resulting solid sorbent particles had spherical shapes and demonstrated physical properties, including an average particle size of 92 to 150 µm, a particle distribution of 50 to 208 µm, a tap density of 0.61 g/ml or greater, and attrition resistance of 6.4 to 86%.

EXAMPLES AND COMPARATIVE EXAMPLES

<$CO_2$ Sorbents Including Various Active Ingredients and Viscosity Modifiers>

The compositions, manufacturing characteristics and physical properties of the mid-temperature range (200~400° C.) dry regenerable solid $CO_2$ sorbent and the slurry according to the present invention will be described in detail through various Examples.

In Examples, based on 5 kg of total solid raw materials, the solid $CO_2$ sorbent includes 22.5 to 60 parts by weight of at least one active ingredient selected from the group consisting of magnesium oxide (MgO), magnesium carbonate ($MgCO_3$), magnesium nitrate hydrate ($Mg(NO_3)_2 \cdot 6H_2O$), calcium magnesium carbonate ($CaMg(CO_3)_2$), potassium carbonate ($K_2CO_3$), sodium carbonate ($Na_2CO_3$), and lithium carbonate ($LiCO_3$) 28 to 40.5 parts by weight of at least one support selected from the group consisting of hydrotalcite (MG-30), γ-alumina (γ-$Al_2O_3$), α-alumina (α-$Al_2O_3$), and Yttria-stabilized zirconia (Yi-$ZrO_2$), 5 to 17 parts by weight of at least one reaction accelerator selected from the group consisting of titanium oxide ($TiO_2$), zirconium oxide ($ZrO_2$), yttrium oxide ($Yi_2O_3$), lanthanum/cerium oxide (La/$CeO_2$), lanthanum oxide ($La_2O_3$) and magnesium silicate ($Mg_3Si_4O_{10}(OH)_2$), 4.9 to 9.7 parts by weight of at least one inorganic binder selected from the group consisting of bentonite and pseudo-boehmite, and 0.1 to 0.3 parts by weight of at least one viscosity modifier selected from the group consisting of glucose and methyl cellulose.

TABLE 1

Compositions and manufacturing characteristics of $CO_2$ sorbents prepared in Examples 1-1 to 1-8

| | Sorbent | 1-1 | 1-2 | 1-3 | 1-4 | 1-5 | 1-6 | 1-7 | 1-8 |
|---|---|---|---|---|---|---|---|---|---|
| Active ingredient (parts by weight) | MC-MgO (50 m$^2$/g) | 33.3 | — | 33 | — | — | — | — | — |
| | $MgCO_3$ | — | 36.9 | — | — | 25 | 40 | 10 | — |
| | $K_2CO_3$ | 18.1 | 20 | 19 | — | 21 | 10 | — | 19 |
| | $LiCO_3$ | — | — | — | 22.5 | — | — | — | — |
| | $Na_2CO_3$ | — | — | — | — | — | — | 19 | — |
| | $Mg(NO_3)_2 \cdot 6H_2O$ | — | — | — | — | — | — | 31 | — |
| | $CaMg(CO_3)_2$ | — | — | — | — | — | — | — | 35 |
| Support (parts by weight) | Hydrotalcite | 26.7 | 21 | 28 | 22.5 | 24 | — | — | 25 |
| | γ-$Al_2O_3$ | — | 3.2 | — | — | 10 | 10 | 10 | 3 |
| | α-$Al_2O_3$ | — | — | — | 28 | — | — | — | — |
| | Yi-$ZrO_2$ | — | 8.4 | 5 | — | 15 | 15 | 20 | 8 |
| Reaction accelerator (parts by weight) | $TiO_2$ | — | — | — | 7 | — | — | — | — |
| | $ZrO_2$ | 5.7 | — | — | 10 | — | — | — | — |
| | $Yi_2O_3$ | 1.9 | — | — | — | — | — | — | — |
| | La/$CeO_2$ | — | — | 5 | — | — | — | — | — |
| | $Mg_3Si_4O_{10}(OH)_2$ | 4.8 | — | — | — | — | 15 | — | — |

TABLE 1-continued

Compositions and manufacturing characteristics of $CO_2$ sorbents prepared in Examples 1-1 to 1-8

| | Sorbent | 1-1 | 1-2 | 1-3 | 1-4 | 1-5 | 1-6 | 1-7 | 1-8 |
|---|---|---|---|---|---|---|---|---|---|
| Inorganic binder (parts by weight) | Na-Bentonite | 4.7 | 5.1 | 4.9 | 4.9 | 4.9 | 4.7 | 4.9 | 4.7 |
| | Pseudo-Boehmite | 4.7 | 5.3 | 5 | 5 | — | 5 | 5 | 5 |
| Viscosity modifier | Glucose (parts by weight) | — | — | — | — | — | 0.3 | 0.1 | 0.3 |
| | Methyl cellulose (parts by weight) | 0.1 | 0.1 | 0.1 | 0.1 | 0.1 | — | — | — |
| Total solid raw materials (parts by weight) | | 100 | 100 | 100 | 100 | 100 | 100 | 100 | 100 |
| Dispersant (parts by weight) | | | | | 0.1~1.0 | | | | |
| Defoamer (parts by weight) | | | | | 0.01~0.5 | | | | |
| Organic binder (parts by weight) | | 0.1~5.0 | | | | | | | |
| Slurry concentration (parts by weight) | | 24.6 | 26.3 | 26.8 | 31.1 | 23.5 | 20.7 | 18.8 | 23.7 |
| Slurry pH | | 10.15 | 9.55 | 10.32 | 10.1 | 11.2 | 10.9 | 8.9 | 11.2 |
| Viscosity (cP) | | 4,000 | 4,180 | 5,380 | 31,833 | 1,707 | 820 | 1,073 | 780 |

The solid raw materials contained in the slurry were sequentially added to distilled water to reach a concentration in a range of 20 to 40 parts by weight while stirring the solid raw materials, thereby preparing a mixed slurry. Here, before addition of the solid raw materials, the dispersant was added to facilitate mixing and dispersion of the solid raw materials. Alternatively, during addition of the solid raw materials, a small amount of the dispersant was added according to the viscosity and stirring extent of the mixed slurry. A small amount of the defoamer was added according to the amount of bubbles generated after adding the dispersant or during stirring of the slurry. To prevent particles of the raw materials having a relatively large specific weight or a large particle size from being precipitated, the mixed slurry was sufficiently stirred using a double-helix mixer at a speed of 10,000 to 25,000 rpm for 10 minutes or more. The mixed slurry was milled twice or more using a high-energy bead mill and homogenized to produce slurry. To the produced slurry was added additional water, a dispersant, etc. to control various characteristics of the slurry, including the viscosity of the slurry, the concentration of solid raw materials, pH, etc., and to facilitate handling of the particles. As an organic binder, 0.1 to 5 parts by weight of polyethylene glycol was added, based on the total weight of the solid raw materials, to be homogenously dispersed in the slurry prior to final comminuting.

The resulting slurry was sieved to remove foreign substances introduced in the slurry preparation process. The concentration of the final slurry from which the foreign substances were removed was adjusted to 18 to 32 parts by weight, and the prepared slurry was then spray-dried.

The formed sorbent particles were pre-dried in a dryer at 120° C. for 2 hours or more and then calcined in a box-shaped furnace, such as a muffle furnace, while elevating the calcining temperature to a final calcining temperature of about 550° C. at a rate of 0.5 to 10° C./min. Thereafter, the final calcining temperature was maintained for 3 hours or more to prepare the final sorbent. In order to effectively remove organic additives and the organic binder added in the slurry preparing process, the furnace was allowed to remain at 200° C., 300° C., 400° C. and 500° C. each for one hour before reaching the final calcining temperature. The prepared sorbents were labeled 1-1 to 1-8 according to the composition of active ingredient, support, reaction accelerator and inorganic binder used.

Table 1 indicates compositions and manufacturing characteristics of the mid-temperature range dry regenerable solid carbon dioxide ($CO_2$) sorbents.

Table 2 summarizes physical properties and reaction characteristics of the manufactured sorbents. The particle shape was observed using an industrial microscope or a scanning electronic microscope (SEM) and the average particle sizes and particle size distributions of the sorbents were measured by the method presented by the standard specification ASTM E-11. Here, 10 g of a sorbent sample was sieved in a sieve shaker for 30 minutes and the average particle size and the particle size distribution of the sorbent sample were measured by the presented method. The tap density of the sorbent sample was measured using an apparatus and a method presented by the standard specification ASTM D 4164-88.

The attrition resistance of the sorbent sample was measured using a 3-hole attrition tester manufactured in compliance with the ASTM D5757-95 according to the testing method and sequence presented by the specification.

Here, an attrition index (AI) refers to a ratio of an amount of fine powder captured and stored after being abraded in an attrition tube at a flow rate of 10 SLPM (Standard Liters Per Minute) for 5 hours, based on an initial sample amount (50 g). The AI is one of the important indexes among requirements of a fluidized bed process. In a case of a commercial fluidized catalytic cracking (FCC) catalyst, the AI may be less than 30%, suggesting that attrition strength was increased as the AI was decreased.

TABLE 2

Physical properties of $CO_2$ sorbents prepared in Examples 1-1, 1-3 and 1-7

| Catalyst | 1-1 | 1-3 | 1-7 |
|---|---|---|---|
| Shape | Sphere | Sphere | Sphere |
| Average particle size (μm) | 150 | 135 | 93 |
| Particle size distribution (μm) | 74~237 | 71~208 | 59~133 |
| Tap density (g/ml) | 0.66 | 0.68 | 0.61 |
| Attrition resistance (%) | 13.7 | 16.0 | 13.7 |
| Calcining temperature (° C.) | 550 | 550 | 550 |

Figure 6:
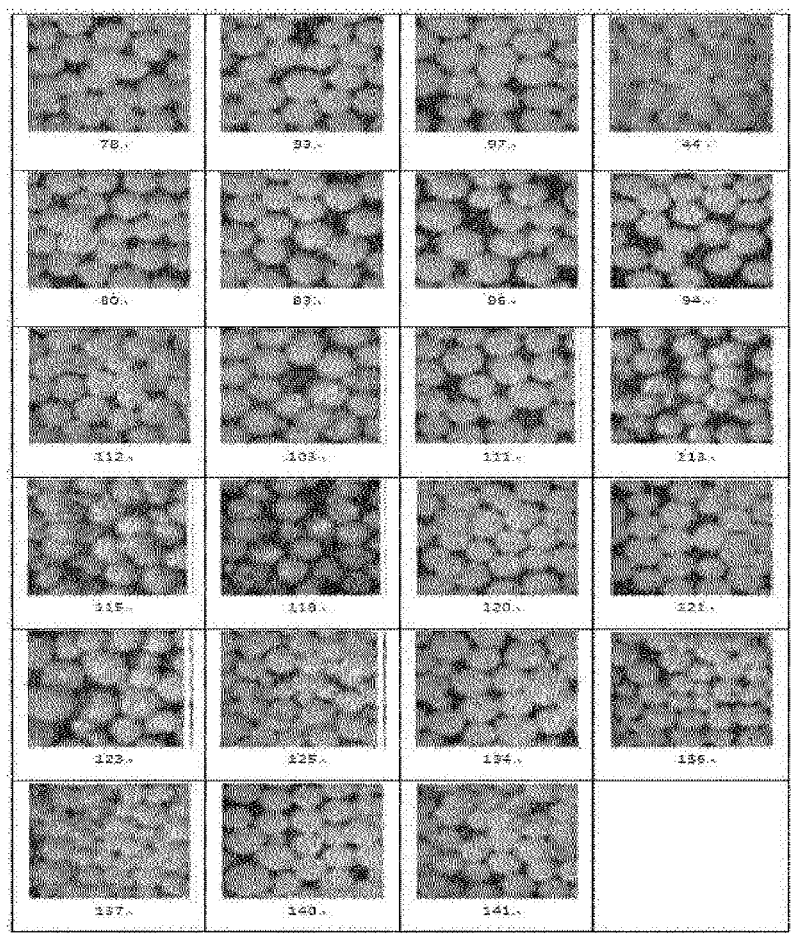
FIG. 6 illustrates photographs showing shapes of sorbents prepared in Examples 1 to 3 of the present invention.

As can be seen from the data in Table 2, the sorbents 1-1, 1-3 and 1-7 demonstrated excellent attrition resistance of 20% or less, compared to the commercial FCC catalyst (less than about 25%), and had physical properties, including an average particle size of 95 to 150 μm, a particle distribution of 58 to 237 μm, and a tap density of 0.61 g/ml or greater, confirming that most physical properties required for the fluidized bed process were satisfied. In addition, the $CO_2$ sorbents presented in these Examples had spherical shapes, as illustrated in FIG. 6.

Figure 7:
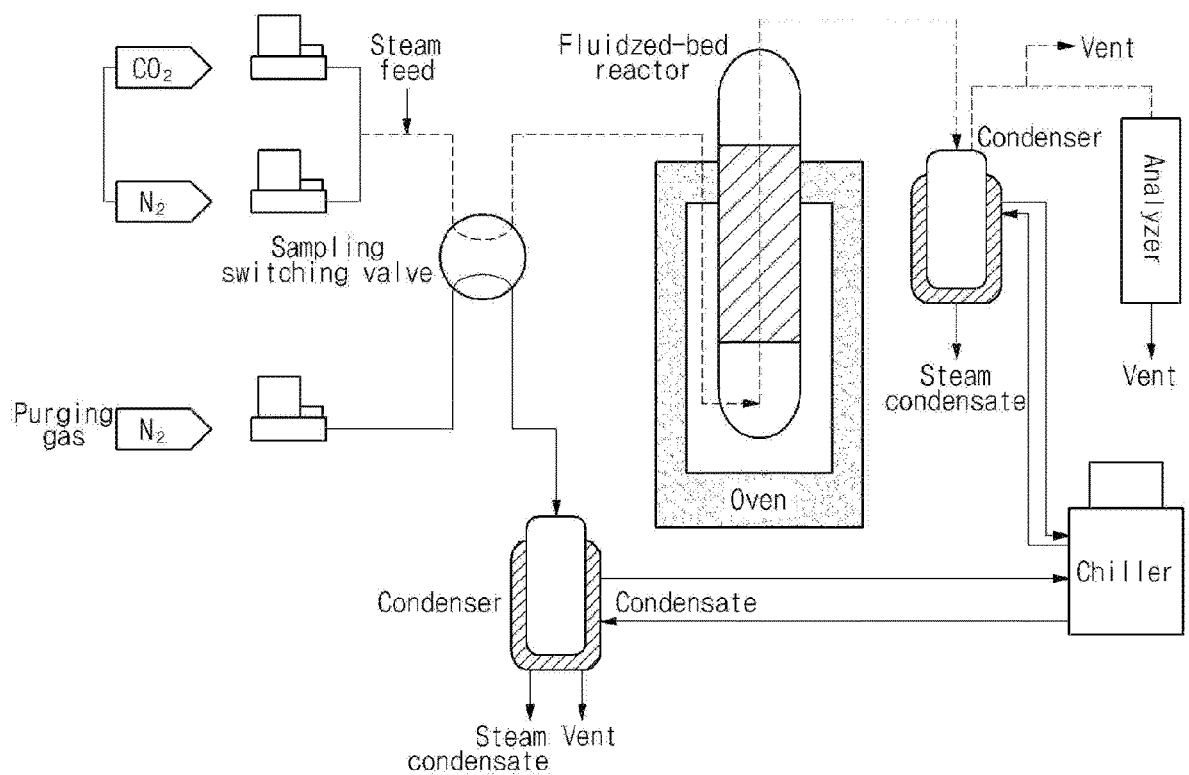
FIG. 7 is a diagram illustrating an apparatus for evaluating the carbon dioxide sorption capacity of carbon dioxide contained in a sorbent prepared in Example 1 of the present invention.

The $CO_2$ sorption capacity levels of the $CO_2$ sorbents prepared in Example 1 were evaluated under conditions of an absorption reaction at 210° C., a regeneration reaction at 400° C., and a pressure of 20 bar using a fluidized bed reactor shown in FIG. 7. Here, the gas composition of the absorption reaction includes 37% $CO_2$, 10% $H_2O$, and 53% $N_2$ as a balance gas, and the gas composition of the regeneration reaction includes 70% $N_2$ and 30% $H_2O$. The sorption capacity was measured for at least two cycles to confirm whether the sorbent reactivity was maintained.

Figure 8:
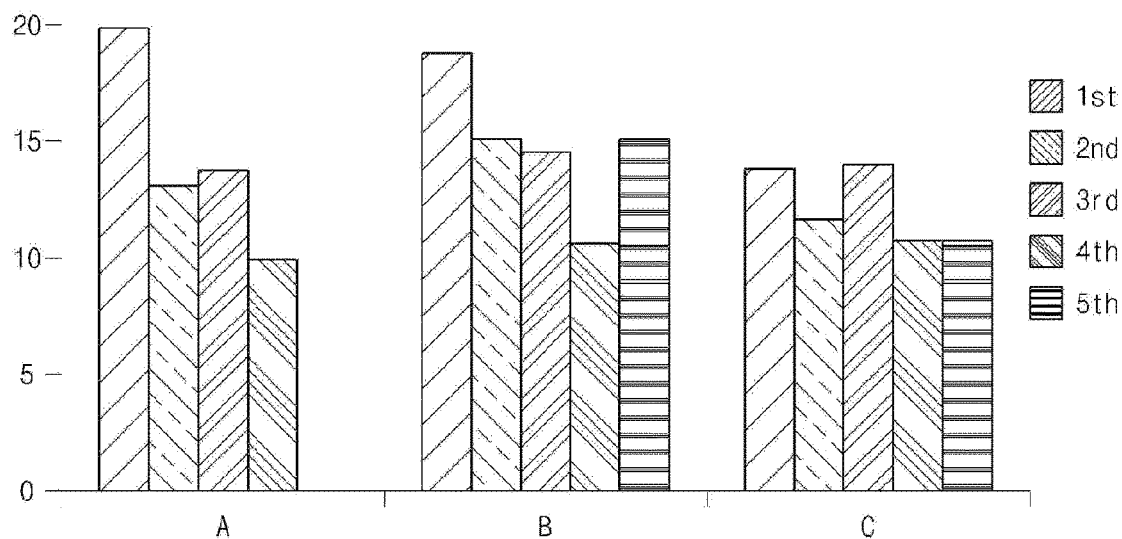
FIG. 8 is a graph illustrating the carbon dioxide sorption capacity depending on the absorption-regeneration repeat cycle of a sorbent prepared in Example 1 of the present invention.

Table 3 summarizes $CO_2$ sorption capacities for absorption-regeneration repeat cycles of the $CO_2$ sorbents prepared in Example 1 and the measured results are graphically illustrated in FIG. 8.

using the composition including, based on 5 kg of total solid raw materials, 44.0 to 61.5 parts by weight of at least one active ingredient selected from the group consisting of magnesium oxide (MgO), manganese oxide (MnO), and potassium carbonate ($K_2CO_3$), 30 to 38 parts by weight of at least one support selected from the group consisting of hydrotalcite (MG-30), γ-alumina (γ-$Al_2O_3$) and Yttria-stabilized zirconia (Yi-$ZrO_2$), 8.8 to 9.9 parts by weight of at least one inorganic binder selected from the group consisting of bentonite and pseudo-boehmite, and 0.1 to 1.0 parts by weight of at least one viscosity modifier selected from the group consisting of saccharose, glucose and a melamine compound (Melment F10).

TABLE 4

Compositions and manufacturing characteristics of $CO_2$ sorbents prepared in Examples 2-1 to 2-8

| Sorbent | | 2-1 | 2-2 | 2-3 | 2-4 | 2-5 | 2-6 | 2-7 | 2-8 |
|---|---|---|---|---|---|---|---|---|---|
| Active ingredient (parts by weight) | MC-MgO (50 m²/g) | 25 | 33.4 | 29.9 | 30 | — | — | — | 30 |
| | SH-MgO (40 m²/g) | — | — | — | — | — | — | 33 | — |
| | STM-MgO (50 m²/g) | — | 1.5 | — | — | — | — | — | — |
| | MnO | 10 | — | 9.9 | 10 | 35 | 35 | 5 | 4.5 |
| | $K_2CO_3$ | 19 | 19 | 19.9 | 20 | 25 | 25 | 19 | 26.6 |
| Support (parts by weight) | Hydrotalcite | 27 | 28 | — | 30 | 30 | 30 | 25 | 22.7 |
| | γ-$Al_2O_3$ | — | — | 29.9 | — | — | — | 3 | 2.7 |
| | Yi-$ZrO_2$ | 9 | 8 | — | — | — | — | 5 | 4.5 |
| Inorganic binder (parts by weight) | Na-Bentonite | 4.9 | 4.9 | 4.4 | 4.8 | 4.8 | 4.8 | 4.8 | 4.3 |
| | Pseudo-Boehmite | 5 | 5 | 5 | 5 | 5 | 5 | 5 | 4.5 |
| Viscosity modifier (parts by weight) | Glucose | 0.1 | 0.1 | 0.5 | 0.1 | 0.1 | 0.1 | 0.1 | 0.1 |
| | Melment F10 | — | 0.1 | 0.5 | 0.1 | 0.1 | 0.1 | 0.1 | 0.1 |
| Total solid raw materials (parts by weight) | | 100 | 100 | 100 | 100 | 100 | 100 | 100 | 100 |
| Dispersant (parts by weight) | | — | — | — | — | — | — | — | — |
| Defoamer (parts by weight) | | 0.1~1.0 | | | | | | | |
| Organic binder (parts by weight) | | 0.01~0.5 | | | | | | | |
| Slurry concentration (parts by weight) | | 23.5 | 22.65 | 23.62 | 27.89 | 24.73 | 24.77 | 22.68 | 29.12 |
| Slurry pH | | 11.2 | 12.62 | 12.80 | 12.74 | 12.56 | 12.81 | 12.46 | 12.64 |
| Viscosity (cP) | | 4,707 | 950 | 310 | 713 | 367 | 690 | 860 | 708 |

TABLE 3

$CO_2$ sorption capacities of $CO_2$ sorbents prepared in Example 1

| Sorption capacity | Sorbent | |
|---|---|---|
| (wt %) | 1-1 | 1-3 |
| 1 cycle | 19.9 | 13.9 |
| 2 cycle | 13.2 | 11.7 |
| 3 cycle | 13.8 | 14.1 |
| 4 cycle | 10.0 | 10.8 |
| 5 cycle | — | 10.8 |

The experiment results showed that the $CO_2$ sorbents 1-1 and 1-3 had excellent initial sorption capacity (1 cycle) of 19.9 to 13.9 wt %. In addition, in absorption-regeneration repeat experiments of 5 cycles, the $CO_2$ sorbents maintained sorption capacity levels of 10 wt % or greater, confirming they had small performance drop widths and performance levels high enough to be applied to commercial processes.

OTHER EXAMPLES OF INVENTION (1) $CO_2$ Sorbents Easily Manufactured Using Magnesium Oxide (MgO) and Manganese Oxide (MnO) as Active Ingredients and a Viscosity Modifier (Example 2)

In Example 2, the mid-temperature range $CO_2$ sorbents were manufactured in the same manner as in Example 1, In Example 2, in order to facilitate improvement of the $CO_2$ sorption capacity, potassium carbonate ($K_2CO_3$) capable of well introducing $CO_2$ to a combination of magnesium oxide (MgO) and manganese oxide (MnO) was used as an active ingredient. In particular, the viscosity was maintained at a considerably low level through an appropriate combination of viscosity modifiers in view of ease of manufacturing method, thereby overcoming a problem of time limitation in view of mass production.

Table 4 indicates compositions and manufacturing characteristics of the sorbents prepared in Example 2.

In view of manufacturing characteristics of Example 2, the sorbents manufactured in other Examples, except for Example 2-1, had relatively low viscosity levels and demonstrated improved sorption capacity and high curability of slurry. That is to say, the manufacturing of the sorbents was easily carried out.

Physical properties of $CO_2$ sorbents prepared in Example 2 were evaluated in the same manner as in Example 1 and evaluation results are summarized in Table 5.

TABLE 5

Physical properties of $CO_2$ sorbents prepared in Examples 2-1 to 2-8

| Catalyst | 2-1 | 2-2 | 2-3 | 2-4 | 2-5 | 2-6 | 2-7 | 2-8 |
|---|---|---|---|---|---|---|---|---|
| Shape | Sphere | Sphere | Sphere | Sphere | Sphere | Sphere | Sphere | Sphere |
| Average particle size (μm) | 120 | 118 | 119 | 112 | 104 | 115 | 115 | 115 |
| Particle size distribution (μm) | 65~184 | 65~182 | 70~179 | 70~161 | 65~149 | 67~169 | 69~168 | 64~167 |
| Tap density (g/ml) | 0.82 | 0.79 | 0.55 | 0.64 | 0.80 | 0.59 | 0.61 | 0.75 |
| Attrition resistance (%) | 6.4 | 11.02 | 86.02 | 21.33 | 39.76 | 81.40 | 61.98 | 24.92 |
| Calcining temperature (° C.) | 550 | 550 | 550 | 550 | 550 | 550 | 550 | 550 |

Figure 9:
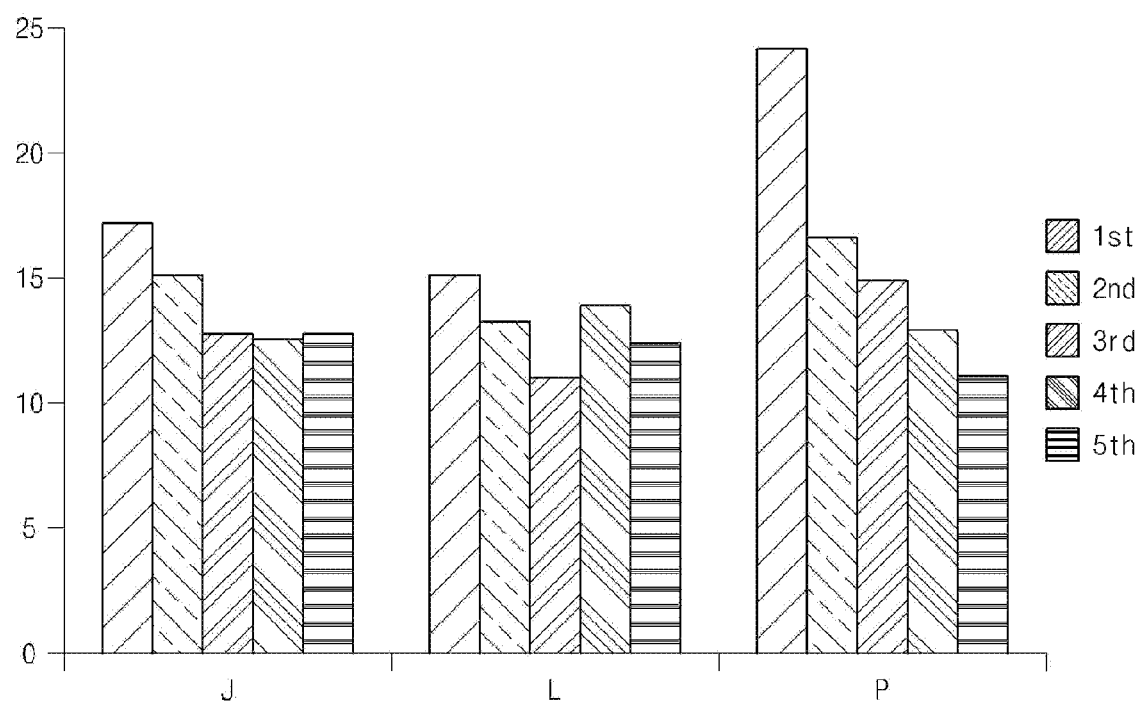
FIG. 9 is a graph illustrating the carbon dioxide sorption capacity depending on the absorption-regeneration repeat cycle of a sorbent prepared in Example 2 of the present invention.

$CO_2$ sorption capacity levels of $CO_2$ sorbents 2-1, 2-2, 2-4, 2-7 and 2-8 prepared in Example 2 were evaluated in the same manner as in Example 1 and evaluation results are summarized in Table 6 and are graphically illustrated in FIG. 9.

TABLE 6

$CO_2$ sorption capacities of $CO_2$ sorbents prepared in Example 2

| Sorption capacity (wt %) | Sorbent | | |
|---|---|---|---|
| | 2-2 | 2-4 | 2-8 |
| 1 cycle | 17.25 | 15.13 | 24.13 |
| 2 cycle | 15.11 | 13.28 | 16.67 |
| 3 cycle | 12.7 | 11.05 | 14.89 |
| 4 cycle | 12.6 | 13.90 | 12.92 |
| 5 cycle | 12.78 | 12.43 | 11.14 |

In Example 2, the $CO_2$ sorbents were manufactured using magnesium oxide (MgO), manganese oxide (MnO) and potassium carbonate ($K_2CO_3$) having capability of well introducing $CO_2$ as main active ingredients and demonstrated various physical properties. Specifically, the $CO_2$ sorbents prepared in Examples 2-2, 2-4 and 2-8 had excellent physical properties and high $CO_2$ sorption capacity.

In particular, the $CO_2$ sorbents prepared in Examples 2-2, 2-4 and 2-8 had high stability in high stability in using the absorption-regeneration repeat cycles. Thus, when the $CO_2$ sorbents are applied to commercial processes in the future, it is determined that the $CO_2$ sorbents have very high commercial applicability in view of ease of manufacture and physical and chemical properties.

(2) Mid-Temperature Range Dry Regenerable $CO_2$ Sorbents Having Excellent Physical and Chemical Properties (Example 3)

In Example 3, the mid-temperature range dry regenerable $CO_2$ sorbent was manufactured in the same manner as in Example 1, using the composition including, based on 5 kg of total solid raw materials, 52 to 64 parts by weight of at least one active ingredient selected from the group consisting of magnesium oxide (MgO) having a specific surface area of 40 $m^2/g$, manganese oxide (MnO), and potassium carbonate ($K_2CO_3$), 26 to 38 parts by weight of at least one support selected from the group consisting of hydrotalcite (MG-30), nano-sized water-dispersible aluminum hydroxide (PB24N4) and Yttria-stabilized zirconia (Yi-$ZrO_2$), 9.4 to 9.9 parts by weight of at least one inorganic binder selected from the group consisting of bentonite and pseudo-boehmite, and 0.1 to 1.0 parts by weight of at least one viscosity modifier selected from the group consisting of glucose and a melamine compound (Melment F10).

Table 7 indicates compositions and manufacturing characteristics of $CO_2$ sorbents prepared in Example 3.

TABLE 7

Compositions and manufacturing characteristics of $CO_2$ sorbents prepared in Examples 3-1 to 3-6

| | Sorbent | 3-1 | 3-2 | 3-3 | 3-4 | 3-5 | 3-6 |
|---|---|---|---|---|---|---|---|
| Active Ingredient (parts by weight) | MC-MgO (50 $m^2/g$) | — | — | — | — | — | — |
| | SH-MgO (40 $m^2/g$) | 35 | 35 | 40 | 41 | 27 | 37 |
| | MnO | — | — | 3 | — | — | — |
| | $K_2CO_3$ | 21 | 19 | 21 | 23 | 25 | 22 |
| Support (parts by weight) | Hydrotalcite | — | 16 | — | — | — | — |
| | γ-$Al_2O_3$ | — | — | — | — | — | — |
| | Yi-$ZrO_2$ | 5 | 5 | 5 | 5 | 5 | 5 |
| | PB-24N4 | 29 | 15 | 21 | 21 | 33 | 26 |
| Inorganic binder (parts by weight) | Na-Bentonite | 4.7 | 4.9 | 4.4 | 4.6 | 4.6 | 4.6 |
| | Pseudo-Boehmite | 5 | 5 | 5 | 5 | 5 | 5 |
| Viscosity modifier (parts by weight) | Glucouse | 0.1 | 0.1 | 0.1 | 0.1 | 0.1 | 0.1 |
| | Melment F10 | 0.2 | — | 0.5 | 0.3 | 0.3 | 0.3 |
| Total solid raw materials (parts by weight) | | 100 | 100 | 100 | 100 | 100 | 100 |
| Dispersant (parts by weight) | | 0.1~1.0 | | | | | |
| Defoamer (parts by weight) | | 0.01~0.5 | | | | | |
| Organic binder (parts by weight) | | — | — | — | — | — | — |
| Slurry concentration (parts by weight) | | 21.86 | 24.19 | 20.40 | 18.85 | 20.26 | 20.30 |
| Slurry pH | | 12.65 | 12.75 | 11.99 | 12.16 | 11.75 | 11.78 |
| Viscosity (cP) | | 600 | 1,557 | 588 | 650 | 760 | 705 |

Physical properties of $CO_2$ sorbents prepared in Example 3 were evaluated in the same manner as in Example 1 and the evaluation results are summarized in Table 8.

TABLE 8

Physical properties of $CO_2$ sorbents prepared in Examples 3-1 to 3-2 and 3-4 to 3-6

| Catalyst | 3-1 | 3-2 | 3-4 | 3-5 | 3-6 |
|---|---|---|---|---|---|
| Shape | Sphere | Sphere | Sphere | Sphere | Sphere |
| Average particle size (μm) | 105 | 119 | 103 | 112 | 108 |
| Particle size distribution (μm) | 50~160 | 68~180 | 67~161 | 67~161 | 67~161 |
| Tap density(g/ml) | 0.84 | 0.96 | 0.83 | 0.96 | 0.89 |
| Attrition resistance (%) | 10.12 | 6.9 | 15.5 | 8.5 | 15.2 |
| Calcining temperature (° C.) | 550 | 550 | 550 | 550 | 550 |

Figure 10:
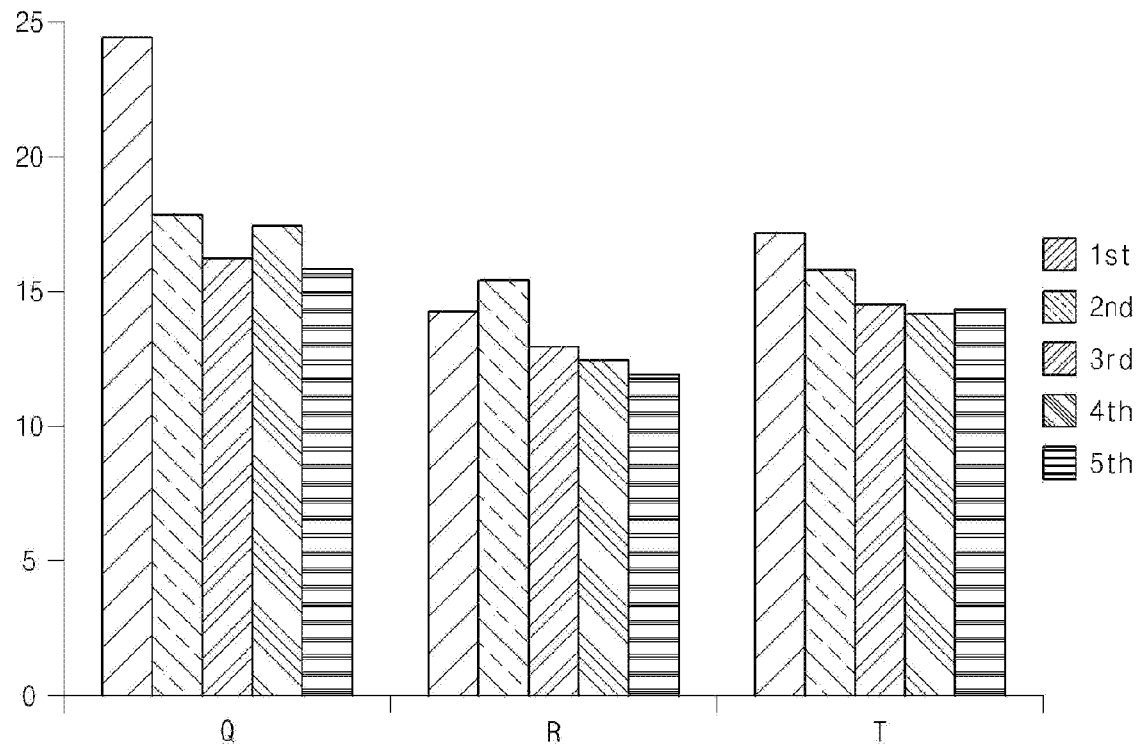
FIG. 10 is a graph illustrating the carbon dioxide sorption capacity depending on the absorption-regeneration repeat cycle of a sorbent prepared in Example 3 of the present invention.
Figure 11:
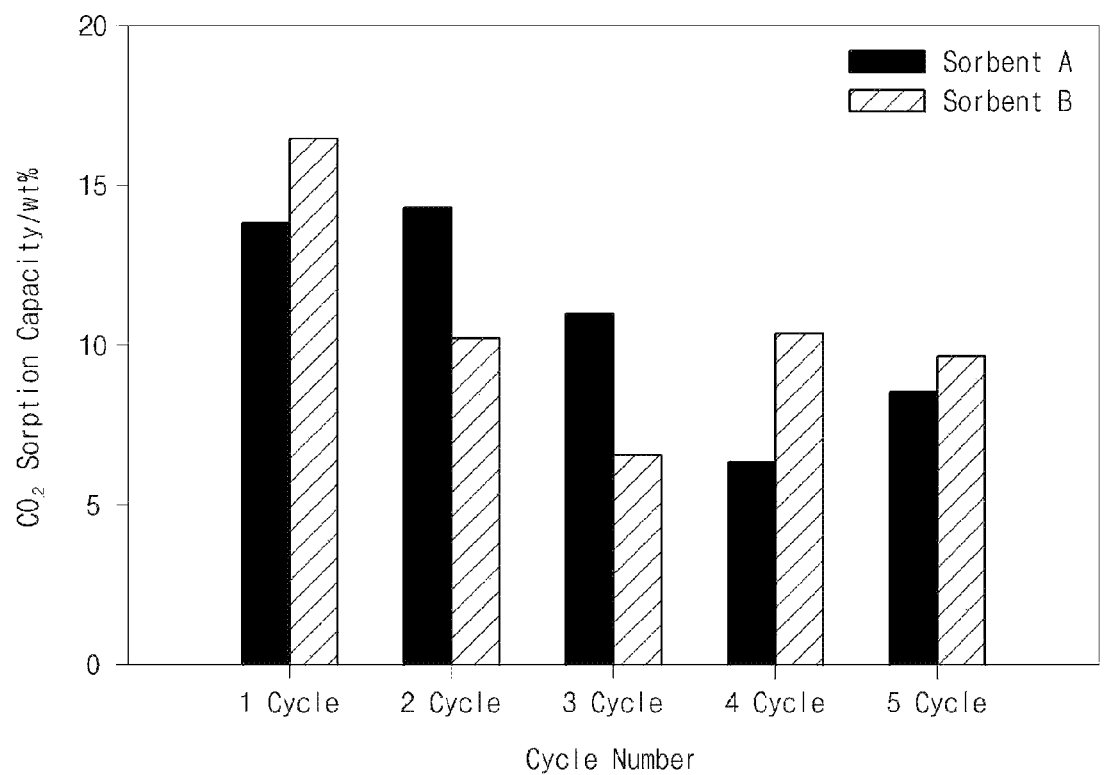
FIG. 11 is a graph illustrating 5-cycle sorption capacity evaluation results of sorbents A and B proposed to have high carbon dioxide ($CO_2$) sorption capacity in a prior patent Korean Patent Publication No. 10-2013-0034933.
Figure 12:
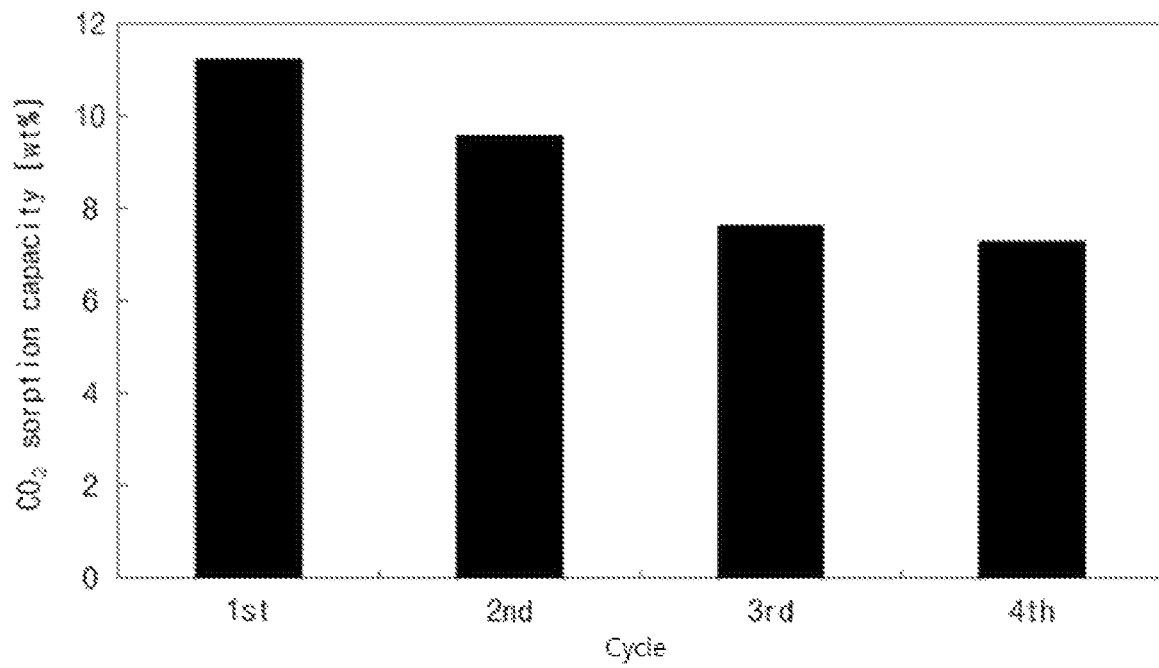
FIG. 12 is a graph illustrating a 4-cycle sorption capacity evaluation result of a sorbent D proposed to have the highest carbon dioxide ($CO_2$) sorption capacity in a prior patent Korean Patent Publication No. 10-2012-0033129.

$CO_2$ sorption capacity levels of the $CO_2$ sorbents prepared in Examples 3-1 to 3-2 and 3-4 to 3-6 among the $CO_2$ sorbents prepared in Example 3 were evaluated in the same manner as in Example 1 and the evaluation results are summarized in Table 9 and are graphically illustrated in FIG. 10.

As can be seen from the data in Table 7, the $CO_2$ sorbents prepared in the 5 Examples in which nano-sized water-dispersible aluminum hydroxide ($PB_{24}N_4$) was used as a support, except for Example 3-3, maintained very high strength levels of about 15% or less. In addition, the $CO_2$ sorbents had a tap density of at least 0.83 to 0.96 g/ml, which is the most appropriate filling density for the fluidized bed process.

TABLE 9

$CO_2$ sorption capacity of $CO_2$ sorbents prepared in Examples 3-1 to 3-2 and 3-4 to 3-6

| Sorption capacity | sorbent | | | | |
|---|---|---|---|---|---|
| (wt %) | 3-1 | 3-2 | 3-4 | 3-5 | 3-6 |
| 1 cycle | 24.48 | 14.35 | 17.2 | 14.0 | 19.0 |
| 2 cycle | 17.93 | 15.46 | 15.8 | 12.5 | 16.1 |
| 3 cycle | 16.30 | 12.97 | 14.6 | | |
| 4 cycle | 17.45 | 12.46 | 14.2 | | |
| 5 cycle | 15.87 | 12.0 | 14.4 | | |

In Example 3, the $CO_2$ sorbents manufactured using nano-sized water-dispersible aluminum hydroxide ($PB_{24}N_4$) as a support had excellent physical properties (tap density, attrition resistance, etc.) that can be suitably applied to the fluidized bed process, and excellent $CO_2$ sorption capacity and high stability in using the absorption-regeneration repeat cycles owing to a uniform distribution of active ingredients dispersed in the support. In particular, the $CO_2$ sorbent prepared in Example 3-1 was evaluated to have noticeably increased attrition resistance and tap density and high $CO_2$ sorption capacity of 15.87 wt % after the repeated use of 5 cycles, which can be advantageously applied to commercial processes.

As demonstrated in the examples of the present invention having been described above, the $CO_2$ sorbents having the following three properties were manufactured:

I. Solid $CO_2$ sorbents comprising various active ingredients having excellent sorption capacity and a viscosity modifier;

II. $CO_2$ sorbents comprising magnesium oxide (MgO) and manganese oxide (MnO) as active ingredients and easily manufactured by employing a viscosity modifier (Example 2); and III. $CO_2$ sorbents having excellent physical properties and reaction characteristics and easily manufactured by employing nano-sized water-dispersible aluminum hydroxide and a viscosity modifier.

INDUSTRIAL APPLICABILITY

As described above, the high level of technology perfection of the mid-temperature range dry regenerable solid $CO_2$ sorbent according to the present invention and the manufacturing method thereof has allowed market entry and use in collecting a $CO_2$ source (pre-combustion or pre-utilization) in syngas application fields such as integrated coal gasification combined cycle (IGCC) power systems, synthetic natural gas (SNG) and synthetic liquid fuel (CTL). Therefore, when considering the goal of greenhouse gas reduction for lowering the global atmospheric temperature to below 2005 level by 2050, since the market volume is expected to increase tremendously, a huge far-reaching effect of the technology will be created.

The invention claimed is:

1. A slurry composition including a mid-temperature range dry regenerable solid carbon dioxide ($CO_2$) sorbent composition, the slurry composition comprising:
   a solvent;
   0.05 to 10 parts by weight of a dispersant;
   0.005 to 0.5 parts by weight of a defoamer; and
   0.1 to 5 parts by weight of an organic binder, based on the total weight of the slurry composition,
   wherein the mid-temperature range dry regenerable solid carbon dioxide ($CO_2$) sorbent composition comprising:
   10 to 70 parts by weight of an active ingredient;
   10 to 60 parts by weight of a support;
   3 to 30 parts by weight of a reaction accelerator;
   5 to 20 parts by weight of an inorganic binder; and
   0.1 to 3 parts by weight of a viscosity modifier, based on the total weight of the mid-temperature range dry regenerable solid carbon dioxide ($CO_2$) sorbent composition,
   wherein the viscosity modifier is at least one selected from the group consisting of glucose and a melamine compound.

2. The slurry composition of claim 1, wherein the dispersant is at least one selected from the group consisting of polycarboxylic acid, polycarboxylic acid amine, polycarboxylic acid amine salt, and polycarboxylic acid soda salt.

3. The slurry composition of claim 1, wherein the defoamer is one of a metal soap-based and a polyester-based.

4. The slurry composition of claim 1, wherein the organic binder is one of polyvinyl alcohol and polyethylene glycol.

5. The slurry composition of claim 1, wherein the active ingredient is at least one selected from the group consisting of magnesium oxide (MgO), magnesium carbonate ($MgCO_3$), magnesium nitrate hydrate ($Mg(NO_3)_2 \cdot 6H_2O$), calcium magnesium carbonate ($CaMg(CO_3)_2$), potassium carbonate ($K_2CO_3$), sodium carbonate ($Na_2CO_3$), lithium carbonate ($LiCO_3$), and manganese oxide (MnO).

6. The slurry composition of claim 1, wherein the support is at least one selected from the group consisting of α-alumina monohydrate, γ-alumina monohydrate, hydrotalcite, Yttria-stabilized zirconia ($Yi\text{-}ZrO_2$), silicon oxide ($SiO_2$), cerium oxide ($CeO_2$) and zirconium oxide ($ZrO_2$).

7. The slurry composition of claim 6, wherein the support further comprises nano-sized water-dispersible aluminum hydroxide.

8. The slurry composition of claim 1, wherein the reaction accelerator is at least one selected from the group consisting of cerium oxide ($CeO_2$), zirconium oxide ($ZrO_2$), titanium oxide ($TiO_2$), yttrium oxide ($Yi_2O_3$), lanthanum/cerium oxide ($La/CeO_2$), lanthanum oxide ($La_2O_3$) and magnesium silicate ($Mg_3Si_4O_{10}(OH)_2$).

9. The slurry composition of claim 1, wherein the inorganic binder is one selected from the group consisting of bentonite and kaolin.

10. A method for manufacturing a mid-temperature range dry regenerable solid carbon dioxide ($CO_2$) sorbent composition, the method comprising:
    preparing a slurry by mixing solid raw materials with water and comminuting the resulting mixture;
    primarily forming a sorbent in the form of spherical particles by spray-drying the prepared slurry; and
    preparing a final sorbent by dry-calcining the sorbent,
    wherein a concentration of the solid raw materials contained in the slurry is in a range of 10 to 50 parts by weight, based on the total weight of the slurry,
    wherein the mid-temperature range dry regenerable solid carbon dioxide ($CO_2$) sorbent composition comprising:
        10 to 70 parts by weight of an active ingredient;
        10 to 60 parts by weight of a support;
        3 to 30 parts by weight of a reaction accelerator;
        5 to 20 parts by weight of an inorganic binder; and
        0.1 to 3 parts by weight of a viscosity modifier, based on the total weight of the mid-temperature range dry regenerable solid carbon dioxide ($CO_2$) sorbent composition,
    wherein the viscosity modifier is at least one selected from the group consisting of glucose and a melamine compound.

11. The method of claim 10, wherein the preparing of the slurry further comprises adding at least one additive selected from a dispersant and a defoamer.

12. The method of claim 10, wherein the active ingredient is at least one selected from the group consisting of magnesium oxide (MgO), magnesium carbonate ($MgCO_3$), magnesium nitrate hydrate ($Mg(NO_3)_2.6H_2O$), calcium magnesium carbonate ($CaMg(CO_3)_2$), potassium carbonate ($K_2CO_3$), sodium carbonate ($Na_2CO_3$), lithium carbonate ($LiCO_3$), and manganese oxide (MnO).

13. The method of claim 10, wherein the support is at least one selected from the group consisting of α-alumina monohydrate, γ-alumina monohydrate, hydrotalcite, Yttria-stabilized zirconia ($Yi-ZrO_2$), silicon oxide ($SiO_2$), cerium oxide ($CeO_2$) and zirconium oxide ($ZrO_2$).

14. The method of claim 13, wherein the support further comprises nano-sized water-dispersible aluminum hydroxide.

15. The method of claim 10, wherein the reaction accelerator is at least one selected from the group consisting of cerium oxide ($CeO_2$), zirconium oxide ($ZrO_2$), titanium oxide ($TiO_2$), yttrium oxide ($Yi_2O_3$), lanthanum/cerium oxide ($La/CeO_2$), lanthanum oxide ($La_2O_3$) and magnesium silicate ($Mg_3Si_4O_{10}(OH)_2$).

16. The method of claim 10, wherein the inorganic binder is one selected from the group consisting of bentonite and kaolin.

* * * * *